United States Patent
Vargha et al.

[11] Patent Number: 6,058,027
[45] Date of Patent: May 2, 2000

[54] MICROMACHINED CIRCUIT ELEMENTS DRIVEN BY MICROMACHINED DC-TO-DC CONVERTER ON A COMMON SUBSTRATE

[75] Inventors: Douglas A. Vargha; Sean S. Cahill, both of Palo Alto, Calif.

[73] Assignee: Maxim Integrated Products, Inc., Sunnyvale, Calif.

[21] Appl. No.: 09/251,103

[22] Filed: Feb. 16, 1999

[51] Int. Cl.$^7$ ........................................................ H02M 3/42
[52] U.S. Cl. ................................................................ 363/33
[58] Field of Search .................................. 363/15, 16, 33; 307/98, 99, 117, 151; 310/309

[56] References Cited

U.S. PATENT DOCUMENTS

| | | |
|---|---|---|
| 4,674,180 | 6/1987 | Zavracky et al. . |
| 5,262,695 | 11/1993 | Kuwano et al. ........................ 310/309 |
| 5,491,604 | 2/1996 | Nguyen et al. . |
| 5,537,083 | 7/1996 | Lin et al. . |
| 5,638,946 | 6/1997 | Zavracky . |
| 5,677,560 | 10/1997 | Zimmer et al. ......................... 257/418 |

*Primary Examiner*—Matthew Nguyen
*Attorney, Agent, or Firm*—Blakely, Sokoloff, Taylor & Zafman LLP

[57] ABSTRACT

The present invention comprises the combination of one or more micromachined circuit elements and a micromachined DC-to-DC step-up converter on the same or different substrates, so as to allow the operation of the micromachined circuit element at a different voltage, typically a higher or a negative voltage, in comparison to the input power supply to the system. The micromachined structure of such a converter requires little chip area and is normally fully compatible with the micromachined structure of other micromachined circuit elements, such switches and resonators, providing obvious advantages when formed on the same substrate as such devices. Similarly, micromachined switches have the advantage of providing substantially greater isolation between the signal being switched and the signal doing the switching, and provide a much better ratio between the off resistance to the on resistance than can be achieved with transistor switching devices, such as by way of example, MOS switches. Micromachined resonators also offer many advantages, such as an equivalent of tuned circuits with very high Q factor, and do so without requiring inductors or active devices in oscillatory circuits having a risk of instability, and of allowing the realization of the equivalent of complicated tuned circuits in a small chip area.

19 Claims, 3 Drawing Sheets

MICROMACHINED CIRCUIT ELEMENTS DRIVEN BY MICROMACHINED DC-TO-DC CONVERTER ON A COMMON SUBSTRATE

BACKGROUND OF THE INVENTION

1. Field of the Invention

The present invention relates to the field of micromachined circuit elements.

2. Prior Art

Micromachined circuit elements are currently the subject of increasing interest because of the advantages such circuit elements have in various applications. By way of example, U.S. Pat. No. 5,491,604 discloses Q-controlled microresonators and tunable electronic filters using such resonators. U.S. Pat. No. 5,537,083 discloses micromechanical signal processors, including micromechanical filters asserted to achieve high signal-to-noise ratios and quality factors on the order of 50,000 in a vacuum. U.S. Pat. No. 4,674,180 discloses a Method of Making a Micromechanical Electric Shunt, and U.S. Pat. No. 5,638,946 discloses a micromechanical switch with insulated switch contact.

In these and other micromechanical devices, mechanical motion is normally caused by electrostatic attraction between two conductive plates (one of which frequently is stationary) having different voltages thereon. In general, the force of attraction between two parallel plates is proportional to the area of the plates times the square of the voltage difference between the plates, divided by the square of the separation between the plates. For devices such as micromachined switches, the full supply voltage difference may be used to actuate the switch. There is, however, a continuing desire to operate integrated circuits at lower and lower supply voltages, which grossly reduces the force available for operation of a switch. For this reason, it is now common to operate micromachined switches from a voltage which is higher than the integrated circuit power supply.

In the case of micromachined oscillatory devices such as resonators, tuned filters and the like, the mechanical force initiating and maintaining the mechanical oscillation of the micromachined devices is normally generated by superimposing an AC voltage on a DC voltage difference between the two plates. One way to achieve this is to provide the drive at the desired drive frequency by alternately switching the full supply voltage across the plates and then shorting the two plates together at the desired drive frequency. This will generate a square wave of force on the resonant member, oscillating between zero force and the maximum force available from the power supply voltage. Alternatively, the oscillatory element may be biased at the power supply voltage through a high resistance, and a voltage switched between the power supply voltage and ground at the desired frequency capacitively coupled thereto. This can potentially double the driving force, though in either case, only a fraction represents the sinusoidal force at the desired frequency, the remainder being harmonics thereof.

BRIEF SUMMARY OF THE INVENTION

The present invention comprises the combination of one or more micromachined circuit elements and a micromachined DC-to-DC step-up converter on the same or different substrates, so as to allow the operation of the micromachined circuit element at a different voltage, typically a higher or a negative voltage, in comparison to the input power supply to the system. The micromachined structure of such a converter requires little chip area and is normally fully compatible with the micromachined structure of other micromachined circuit elements, such switches and resonators, providing obvious advantages when formed on the same substrate as such devices. Similarly, micromachined switches have the advantage of providing substantially greater isolation between the signal being switched and the signal doing the switching, and provide a much better ratio between the off resistance to the on resistance than can be achieved with transistor switching devices, such as by way of example, MOS switches. Micromachined resonators also offer many advantages, such as an equivalent of tuned circuits with very high Q factor, and do so without requiring inductors, and of allowing the realization of the equivalent of complicated tuned circuits in a small chip area. Exemplary devices are disclosed.

DETAILED DESCRIPTION OF THE INVENTION

Figure 1:
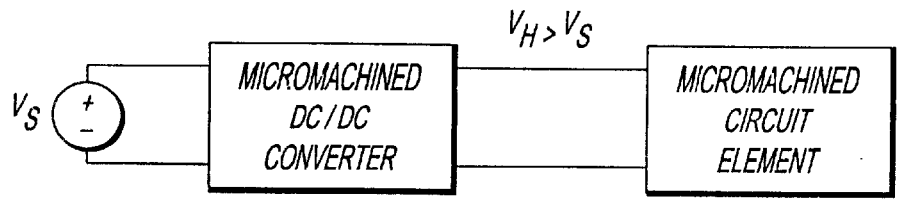
FIG. 1 is a block diagram of the present invention in its most general sense.

First referring to FIG. 1, a block diagram of the present invention in its most general sense may be seen. As shown therein, a DC power source $V_H$ is coupled to a micromachined DC/DC converter, which steps up the voltage source $V_S$ to an output voltage $V_H$ greater than $V_S$. This higher voltage $V_H$ is then used to operate a micromachined circuit element of some kind, examples thereof to be subsequently described. The voltage $V_H$, which is greater than the supply voltage $V_S$, may be used by the micromachined circuit element as a bias voltage, or alternatively as the full power required to operate the micromachined circuit element. Also, while the micromachined DC-to-DC converter and the micromachined circuit element are preferably fabricated on the same substrate, alternatively the micromachined DC-to-DC converter and the micromachined circuit element may be on separate substrates. In that regard, the micromachined DC-to-DC converter might be used to operate a plurality of micromachined circuit elements, some of which might be on the same substrate and some of which might be on separate substrates. The specific design of the micromachined DC-to-DC converter used for the present invention is not part of the invention, but possible designs for such converters are described for completeness of this disclosure.

Micromachined converters are electromechanical devices which convert electrostatic forces into mechanical motion of one or more resonant or near-resonant members, then convert that motion into a varying voltage having a peak higher than the supply voltage. The peaks of that higher voltage are used to provide an output at a higher voltage than the supply voltage causing the original mechanical motion.

Figure 4:
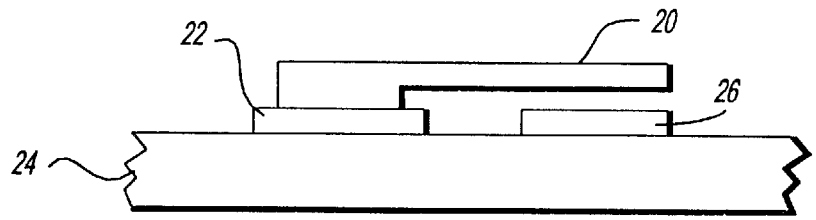
FIG. 4 is a schematic side view of a vibratory element of a micromachined DC-to-DC converter.
Figure 5A:
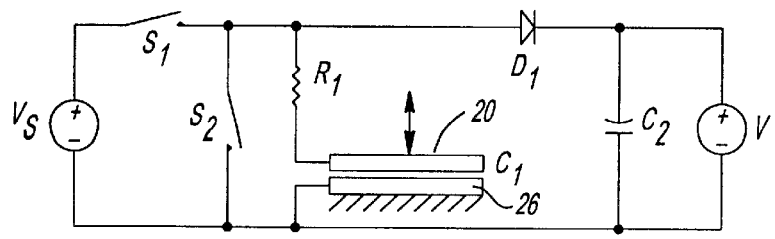
FIGS. 5a and 5b illustrate exemplary circuits for the operation of the device of FIG. 4 for DC to DC converters to provide a positive output voltage and a negative output voltage, respectively.

Referring to FIGS. 4 and 5a, a schematic side view of a vibratory element of a micromachined DC-to-DC converter and a circuit for the operation thereof may be seen. As shown in FIG. 4, a simple micromachined beam 20 is anchored in region 22 to a substrate 24 and is free to vibrate over conductive plate-like member 26 on the substrate and in close proximity to the vibratory element 20. It is presumed in FIG. 4 that the vibratory element 20 is electrically conductive, though alternatively a local area thereof may be made electrically conductive for this purpose. As may be seen in the circuit of FIG. 5a, the vibratory element 20 forms one of the capacitor plates for capacitor C1, formed by vibratory element 20 and conductive region 26 on the substrate 24 (FIG. 4).

The resistor $R_1$ shown in FIG. 5a is for current limiting purposes and may be a separate circuit element, or alternatively, effectively present by the resistance of switches $S_1$ and $S_2$, the conductive lines, etc. Typically, the time constant provided by resistor $R_1$ and capacitor $C_1$ will be substantially less than the period of the vibration of vibratory element 20. When switch $S_1$ is closed, the power supply voltage $V_S$ will be applied directly across the vibratory element 20 and plate 26, causing the vibratory element 20 to be attracted to plate 26 with a force F equal to:

$$F = \frac{\varepsilon A}{2}\left(\frac{V_s}{d}\right)^2$$

where:
  ε=permitivity of free space
  A=the area of each plate
  V=the voltage between the plates
  d=the separation between the plates (which varies with time)

When the vibratory element 20 deflects to a position of closest proximity to plate 26, switch $S_1$ will be opened and switch $S_2$ closed. Now the voltage between vibratory element 20 and plate 26 is zero, allowing the vibratory element 20 to spring away from plate 26 to a position of maximum spacing from plate 26. By operating the device in a vacuum (typically within an enclosure which had been evacuated and then sealed), the alternate nonoverlapping closing and then opening of the switches $S_1$ and $S_2$ at or near the natural frequency of the vibratory element 20 will cause the same to vibrate with an increasing amplitude at the frequency of operation of the switches. During this mechanical energy buildup phase, voltage is applied between the two plates during the time the vibratory element moves from its greatest separation from plate 26 to the time of its closest approach to plate 26, the electrostatic forces due to the voltage difference adding energy to the vibratory element. Then, when switch $S_1$ is opened and switch $S_2$ is closed, the electrostatic force between the vibratory element 20 and plate 26 is removed, allowing the vibratory element to spring back to its position of furthest separation from plate 26. Thus, mechanical energy is added to the vibratory element in alternate half cycles of vibration thereof. If, after an appropriate buildup of energy in the vibration of the vibratory element 20, switch $S_1$ is opened during the closest proximity of vibratory element 20 to plate 26, but switch $S_2$ is not closed for the subsequent half cycle of vibration, the voltage $V_C$ on capacitor C1, as the vibratory element 20 moves away from the plate 26 during that half cycle, will be equal to:

$$V_c = \frac{Q}{C} = \frac{Qd}{\varepsilon A}$$

But $Q=CV_S$ at the time switch $S_1$ was opened, namely when d was at its minimum value $d_{min}$. Therefore:

$$\frac{V_c}{V_s} = \frac{d}{d_{\min}}$$

Thus as vibratory element 20 moves away from its position of closest proximity to plate 26, the charge on capacitor $C_1$ will not change (switches $S_1$ and $S_2$ both being open and diode $D_1$ not yet being forward biased), but instead the voltage between the vibratory element 20 and plate 26 will increase, ultimately forward biasing diode D1 and adding charge to smoothing capacitor C2 to provide the voltage $V_H$ higher than the supply voltage $V_S$ provided to the circuit. The number of mechanical energy buildup cycles before an energy dump cycle may be readily selected based on the mechanical and electrical parameters of the converter.

Figure 5B:
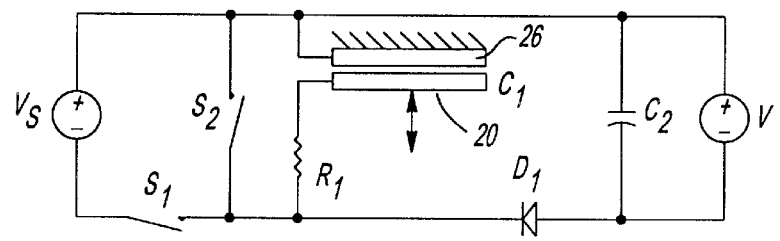

In FIG. 5a, the low side of the power supply is common with one side of the output, namely the low side of the output. FIG. 5b, substantially the same circuit is shown as in FIG. 5a, though with the high side of the input and output being in common, and the diode and the vibratory element moved to the low side of the input. The operation of this circuit is the same as that of FIG. 5a, and again generates an output voltage V which is greater than $V_S$. However this time, with the high side of $V_S$ and V common, the negative side of V will be below the common voltage. By way of one example, if the parameters and operating conditions are chosen so that $V=2V_S$, then the input power supply provides a common voltage and $V_S$, and the micromachined converter provides an output of $-V_S$, for a balanced supply of $\pm V_S$ relative to the common voltage.

Other types of micromachined converters are also known. By way of example, micromachined converters may be configured with two vibratory elements or a single vibratory element having multiple plates thereon. In the case of the use of two vibratory elements, one is used to convert the electrostatic forces powered by the input power supply to vibratory motion in a manner similar to that previously described, and the second is used to convert vibratory motion to the higher voltage electrical output. For this purpose, a coupling is needed between the two vibratory elements, which itself may be a spring coupling, so that energy from the first vibratory element is transferred to the second vibratory element. As before, the system is operated at or near its natural frequency, namely, at or near the pole in a transfer function for $X_2/F_S$, where $X_2$ is the position of the second vibratory element and $F_S$ is the force on the first vibratory element caused by the switching of the power supply $V_S$. The operation of a micromachined converter with a single vibratory element with multiple plates is very similar, being equivalent to the two vibratory element case with direct coupling between the vibratory elements. In substantially any type of micromachined converter, regulation of the output voltage may be accomplished in any of various ways. By way of example only, regulation of the output may done by use of a linear regulator, or by a fixed voltage shunt across the micromachined converter output, such as a Zener diode or a more accurate voltage reference. Also if desired, regulation could be accomplished by feedback of the output voltage (typically as divided down to a lower the voltage) to control the switches, holding both switches off on one or more cycles to limit the output voltage as desired, or changing the phase of the switch operation relative to the vibratory motion to control proportionally or otherwise, the energy transfer per cycle from the power supply to the vibratory element.

Figure 2:
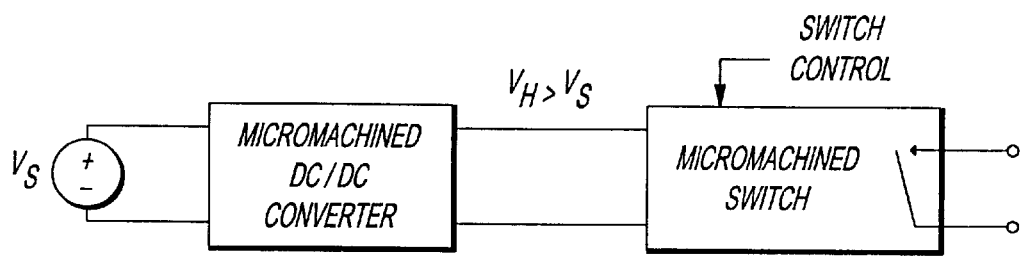
FIG. 2 is a block diagram illustrating one embodiment of the present invention.
Figure 6:
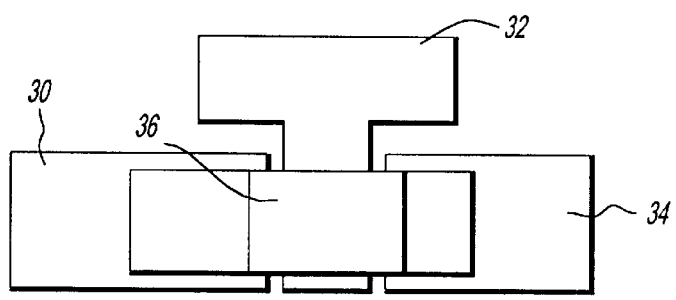
FIGS. 6 and 7 illustrate a simple micromachined switch.
Figure 7:
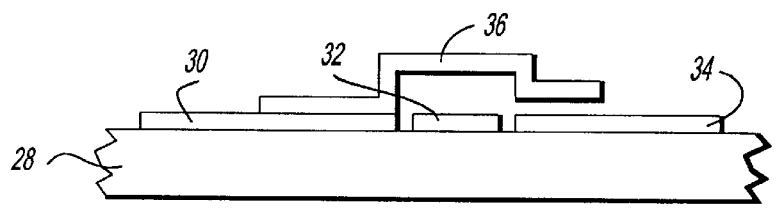

Now referring to FIG. 2, a block diagram illustrating one specific embodiment of the present invention may be seen. In this Figure, the voltage $V_H$ generated by the micromachined DC-to-DC converter is used to power a micromachined switch, the state of the switch being controlled by a switch control signal. A simple micromachined switch is illustrated in FIGS. 6 and 7. As shown therein, a substrate 28 is provided with three electrically conductive regions, 30, 32 and 34. A conductive switch element 36 is formed on conductive area 30 by micromachining techniques to pass over conductive region 32 and overhang conductive region 34. By applying a voltage between conductive regions 30 and 32, the switch element 36 may be caused to deflect as a result of the electrostatic forces thereon, so as to come in contact with conductive region 34, thereby electrically connecting conductive regions 30 and 34 to provide the desired switch closure. The switching element 36 forming one of the plates of the electrostatic forcer, as well as one of the switch contacts, is therefore in common with both the electrostatic forcer and the switch itself. Consequently, the switch is not isolated, and most appropriately used to controllably couple one switch contact to a fixed voltage, such as to ground.

Figure 8:
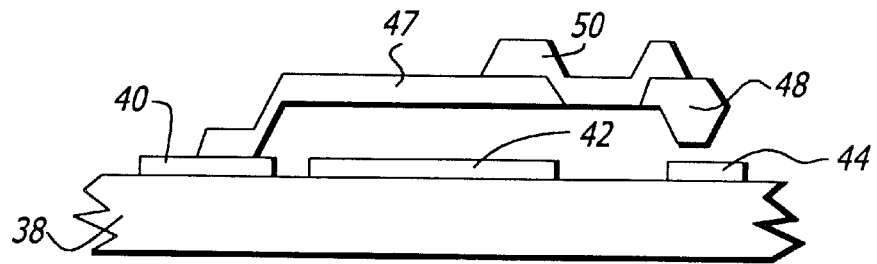
FIGS. 8 and 9 illustrate another type of micromachined switch.
Figure 9:
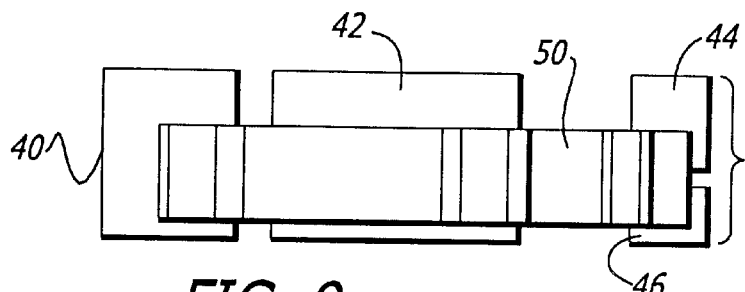

Another type of micromachined switch, described in U.S. Pat. No. 5,638,946 and illustrated in FIGS. 8 and 9, utilizes a substrate 38 having four conductive regions 40, 42, 44 and 46 thereon, with a micromachined cantilevered structure comprising conductive regions 47 and 48 and insulated region 50 supported on conductive region 40. Conductive regions 42 and 47 provide the electrical contacts for the switch control, with conductive member 48 providing switch closure when the switching member is deflected so that conductive region 48 is in electrical contact with conductive regions 44 and 46. Such an arrangement has the advantage of providing an electrically isolated switch closure, particularly useful in applications wherein neither switch contact may be at a predetermined potential, among other applications. The formation of such a micromachined switch is well known and well described in the '946 Patent herein before referred to, as well as the prior art referred to therein, and accordingly will not be further described herein.

Figure 3:
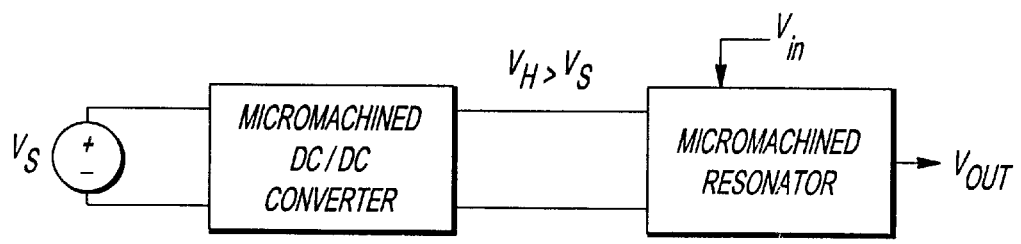
FIG. 3 is a block diagram illustrating another embodiment of the present invention.
Figure 10:
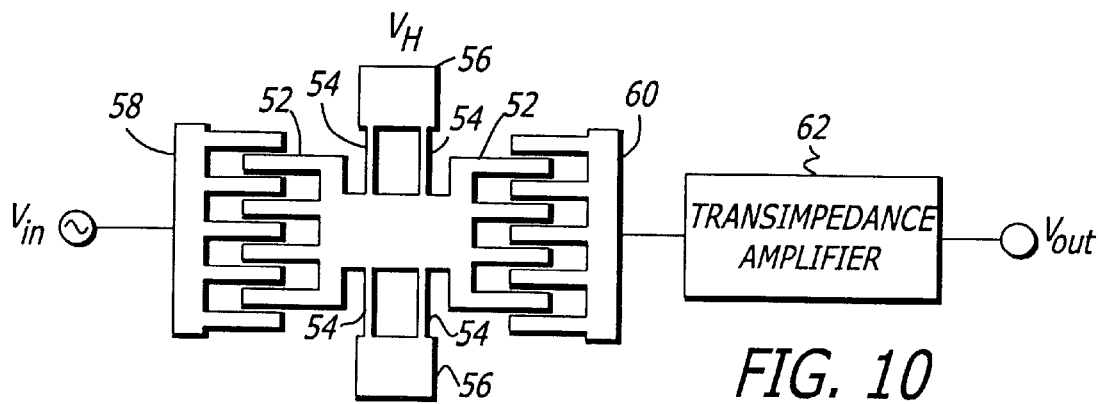
FIG. 10 is a schematic illustration of an exemplary micromachined resonator.

Now referring to FIG. 3, a block diagram illustrating another embodiment of the present invention may be seen. As shown therein, the micromachined DC-to-DC converter is used to provide the higher voltage $V_H$ to a micromachined resonator providing an output voltage $V_{OUT}$ responsive to an input voltage $V_{IN}$ in accordance with the transfer function of the resonator. (As used herein, the words resonator and micromachined resonator are used in the singular, even though such a device will frequently utilize more than one resonant member to provide a transfer function dependent upon the specific characteristics of the plurality of resonator members.) While the micromachined resonator shown in FIG. 3 may take various forms, such as by way of example, those shown in U.S. Pat. Nos. 5,491,604 and 5,537,083, an exemplary micromachined resonator is schematically shown in FIG. 10. As shown therein, first and second comb-like structures 52 are mechanically and electrically coupled together and supported on flexure members 54 by supports 56, supported on a substrate and electrically coupled to the higher voltage $V_H$. An input voltage $V_{IN}$ is electrically coupled to a comb-like structure 58 interfitting with one of the comb-like structures 52. The input voltage $V_{IN}$ in such an embodiment would normally vary around a relatively low voltage in comparison to $V_H$, and in some instances could be capacitively coupled to vary around ground potential. In any event, the mass of the combs 52 and connecting structure, together with the spring rate of flexures 54, provide a single spring mass system responsive to the electrostatic forces between comb 58 and the interfitting comb 52. A further comb structure 60 interfits with the second comb structure 52, with the second comb structure 60 being coupled to a transimpedance amplifier 62 for providing the output $V_{OUT}$ for the device.

The operation of the exemplary device of FIG. 10 is as follows. The force exerted on the left comb-like structure 52 by the comb-like structure 58 is proportional to the square of the difference in voltages between $V_H$ and $V_{IN}$. Thus, the force F may be written in equation form as:

$$F \propto (V_H - V_{IN})^2 = V_H^2 - 2V_H V_{IN} + V_{IN}^2$$

This force has a component proportional to the square of $V_H$, a second component proportional to the product of $V_H$ and $V_{IN}$, and a third component proportional to the square of $V_{IN}$. The component proportional to $V_H^2$ is merely a bias force independent of the input voltage, and thus independent of the signal to be processed by the micromachined resonator. The component proportional to the product of $V_H$ and $V_{IN}$, however, is obviously directly proportional to the input voltage $V_{IN}$, and thus directly proportional to the signal to be processed by the resonator. The third component proportional to $V_{IN}^2$, $V_{IN}$ being an AC signal, in turn has a DC component and components at twice the frequency of the components of the AC input signal $V_{IN}$. These normally are out of the frequency range of the response of the resonator, and accordingly, do not have any effect on the output thereof.

On the output side of the device shown in FIG. 10, the transimpedance amplifier 62 maintains the voltage of the comb-like structure 60 at a constant value, in the exemplary embodiment shown in FIG. 10, at a value which is low in comparison to the higher bias voltage $V_H$. The capacitance of the comb-like capacitor structure is a linear function of the x displacement of the moveable comb, namely:

$$C = C_0 + k_1 x$$

where: x is the position of the moveable comb
$C_0$ is the capacitance for x=0
$k_1$=the rate of change of capacitance with a change in position of the moveable comb Since the voltage V between the higher voltage $V_H$ and the input voltage to the transimpedance amplifier is held constant by the transimpedance amplifier, and the charge Q on the comb-like output structure is equal to the voltage difference V between the combs times the capacitance C of the comb-like structure (Q=CV):

$$i_{out} = \frac{dQ}{dT} = V\frac{dC}{dT} = V\frac{\partial C}{\partial x}\frac{\partial x}{\partial t} = V k_1 \frac{\partial x}{\partial t}$$

Thus, the output of the transimpedance amplifier is proportional to the velocity of the movable comb-like structures, which of course will depend on the amplitude and frequency of the input voltage $V_{IN}$. Obviously, for the simple single element structure used in the example of FIG. 10, the transfer function for $V_{OUT}/V_{IN}$ will be a relatively simple function, having a single pole at the resonant frequency of the spring mass system, though is used herein as a representative of much more complicated resonant structures, such as for signal processing, filters, etc., various structures and methods of fabrication of which are well known in the prior art.

The use of the comb-like structures, such as in the exemplary schematic embodiment of FIG. 10, has certain advantages. For instance, with respect to the comb-like structure responsive to the input voltage $V_{IN}$, the variation in the electrostatic force on the suspended structure with a variation in the input voltage $V_{IN}$ is independent of the position x of the suspended structure, thus providing the desired force proportional to the input voltage under all normal operating conditions. With respect to the comb-like structure providing the output of the resonator, this too provides an output independent of the position of the suspended structure within the normal operating range of the resonator and, when operating into a transimpedance amplifier, provides a linear output. Obviously, the output comb-like structure could be operating into a voltage amplifier or transconductance amplifier, though some nonlinearity in the output would be incurred. Similarly, flat plate capacitance structures could be used for the forcing device and/or the output device, though such devices would be gap sensitive, and thus position sensitive with respect to the x position (and thus the motion) of the suspended structure.

This is to be compared with the flat plate capacitance structure of the switches shown in FIGS. 6 through 9. Such flat plate structures for the electrostatic forcer for the switch can have certain advantages. Obviously, there is the advantage of simplicity of structure. There is also the advantage that since the amplitude of the spring deflection of the switch member is proportional to the deflection force, whereas the electrostatic deflecting force itself is inversely proportional to the gap between the capacitor plates, the switch may be provided with a controlled hysteresis, providing a faster and more positive switching action. Still, the form of the capacitive structure, whether for a micromachined switch or for resonator structures, and for forcers or sensing devices, are a matter of design choice. Accordingly, the disclosure of exemplary forms is by way of example only, and is by no means intended to exclude other forms of such structures.

The present invention has a number of advantages over other techniques for operating micromachined devices such as switches and micromachined resonators. Most integrated circuits today operate on such a low voltage that it is not practical, in most cases, to attempt to operate micromachined devices at such low voltages, at least without a substantially higher bias voltage for the micromachined device. Generation of higher voltages by other techniques, while well known, have disadvantages in terms of chip area and/or requiring external components, particularly large components. Obviously, any form of voltage step-up requiring inductors is impractical in terms of cost and circuit board area requirement, unless considerable power at the higher voltage is needed for other purposes. Charge pumping systems can be fully integrated, though can require higher chip area than a simple micromachined converter. Also, the micromachined structure of such a converter is normally fully compatible with the micromachined structure of switches and resonators, providing obvious advantages when formed on the same substrate as such devices. Similarly, micromachined switches have the advantage of providing substantially greater isolation between the signal being switched and the signal doing the switching, and provide a much better ratio between the off resistance to the on resistance than can be achieved with transistor switching devices, such as by way of example, MOS switches. Micromachined resonators also offer many advantages, such as an equivalent of tuned circuits with very high Q factor, and do so without requiring inductors, and of allowing the realization of the equivalent of complicated tuned circuits in a small chip area.

Thus while the present invention has been disclosed and described herein with respect to exemplary embodiments thereof, it will be understood by those skilled in the art that various changes in form and detail may be made therein without departing from the spirit and scope of the invention.

What is claimed is:

1. A micromachined system comprising:
   a micromachined DC-to-DC converter coupled to a first power supply having a first voltage, the converter having at least one vibratory element converting electrostatic forces provided by the first voltage to a second voltage;
   a micromachined circuit element coupled to the second voltage, the micromachined circuit element having at least one member controllably electrostatically deflected to provide a circuit function.

2. The micromachined system of claim 1 wherein the second voltage is higher than the first voltage.

3. The micromachined system of claim 1 wherein the second voltage is negative relative to the first voltage.

4. The micromachined system of claim 1 wherein the micromachined circuit element is a switch.

5. The micromachined system of claim 4 wherein the micromachined DC-to-DC converter and the micromachined switch are formed on the same substrate.

6. The micromachined system of claim 4 wherein the micromachined DC-to-DC converter and the micromachined switch are formed on different substrates.

7. The micromachined system of claim 1 wherein the micromachined circuit element is a resonator.

8. The micromachined system of claim 7 wherein the micromachined DC-to-DC converter and the micromachined resonator are formed on the same substrate.

9. The micromachined system of claim 7 wherein the micromachined DC-to-DC converter and the micromachined resonator are formed on different substrates.

10. The micromachined system of claim 1 wherein the micromachined circuit element is powered by the second voltage.

11. The micromachined system of claim 1 wherein the second voltage provides a bias voltage for the micromachined circuit element.

12. A micromachined system comprising:
    a micromachined DC-to-DC converter coupled to a first power supply having a first voltage, the converter having at least one vibratory element converting electrostatic forces provided by the first voltage to a second voltage;
    a micromachined switch coupled to the second voltage and being controllably operable therefrom.

13. The micromachined system of claim 12 wherein the second voltage is higher than the first voltage.

14. The micromachined system of claim 12 wherein the second voltage is negative relative to the first voltage.

15. The micromachined system of claim 12 wherein the micromachined DC-to-DC converter and the micromachined switch are formed on the same substrate.

16. The micromachined system of claim 12 wherein the micromachined DC-to-DC converter and the micromachined switch are formed on different substrates.

17. A micromachined system comprising:

a micromachined DC-to-DC converter coupled to a first power supply having a first voltage, the converter having at least one vibratory element converting electrostatic forces provided by the first voltage to a second voltage higher than the first voltage;

a micromachined resonator providing an output responsive to an input, the micromachined resonator being coupled to the second voltage and biased thereby.

18. The micromachined system of claim 17 wherein the micromachined DC-to-DC converter and the micromachined resonator are formed on the same substrate.

19. The micromachined system of claim 17 wherein the micromachined DC-to-DC converter and the micromachined resonator are formed on different substrates.

* * * * *